Nov. 3, 1970                    H. G. FERGUSON                    3,537,790
                      NEGATIVE FEEDER FOR PHOTOGRAPHIC PRINTER
Filed July 22, 1968                                          4 Sheets-Sheet 1

INVENTOR
HAROLD G. FERGUSON
BY
Marechal, Biebel, French & Bugg
ATTORNEYS

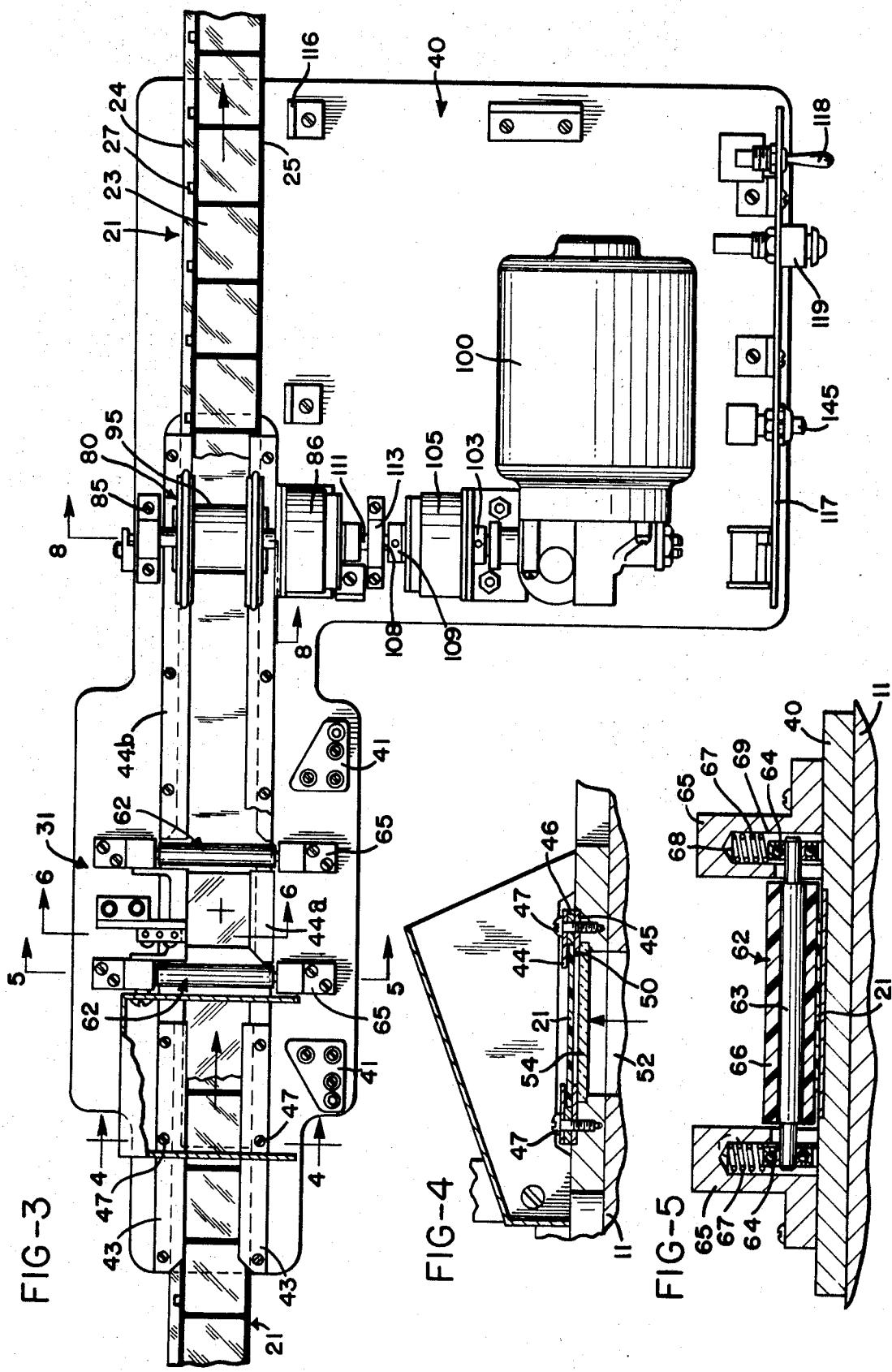

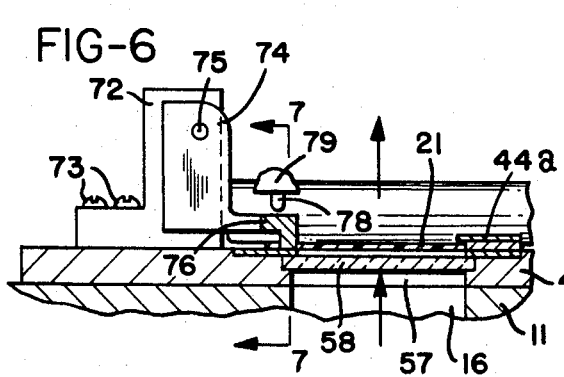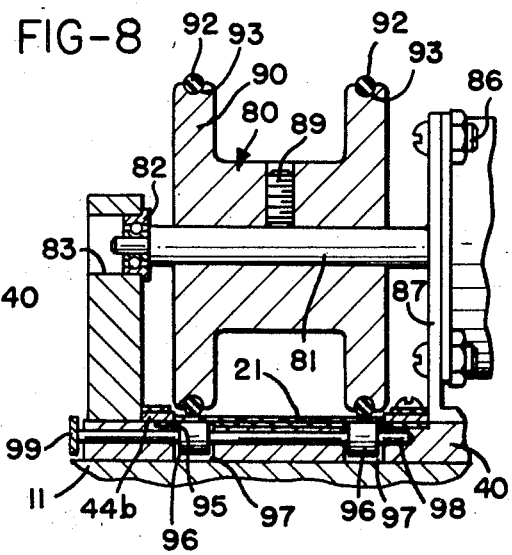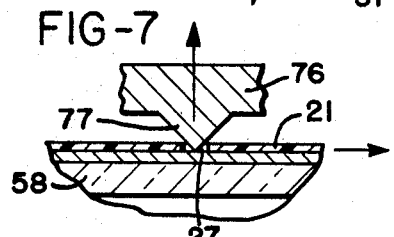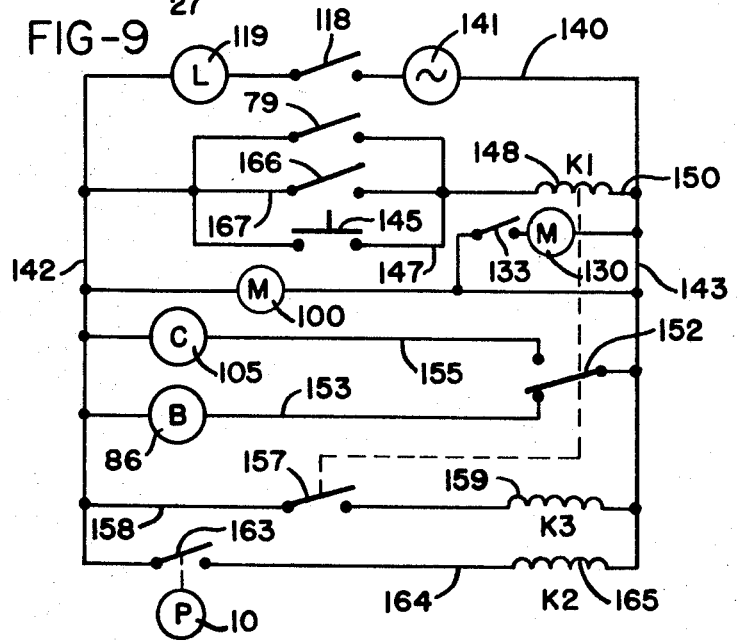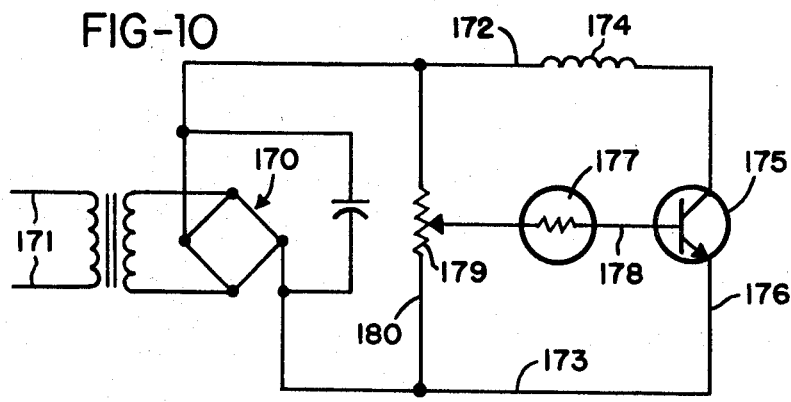

United States Patent Office 3,537,790
Patented Nov. 3, 1970

3,537,790
NEGATIVE FEEDER FOR PHOTOGRAPHIC PRINTER
Harold G. Ferguson, Dayton, Ohio, assignor to Progressive Industries Corporation, Dayton, Ohio, a corporation of Ohio
Filed July 22, 1968, Ser. No. 746,676
Int. Cl. G03b 27/52
U.S. Cl. 355—41         10 Claims

ABSTRACT OF THE DISCLOSURE

An attachment adapted to be mounted on a photographic printer for the purpose of automatically and continuously feeding the negatives through the printer. The negative feeder includes apparatus for advancing the negatives one frame at a time by use of a clutch-brake drive in controlled relationship with the printer. The strip of negatives is engaged and driven by a drive wheel having resilient tires which engage the marginal edges of the negatives.

BACKGROUND OF THE INVENTION

The making of prints from negatives at a high rate of speed has been at least partially automated by the use of photographic printer of the type shown in the United States patent of McAdams et al. No. 3,025,758. However, the feeding of the negatives through the film gate in equipment of this type has heretofore been accomplished manually or with a device having a pawl which advances the negative one frame at a time. Such apparatus is relatively slow, tends to damage the negative, and requires the constant attention of the operator.

SUMMARY OF THE INVENTION

Automatic means for advancing a continuous strip of negatives in a photographic printer including means for advancing the negative one frame at a time and for stopping and starting the drive apparatus accordingly. Suitable supply and take-up devices are provided, and an improved drive arrangement engages the film on at least one marginal edge of the strip.

In addition, means are provided for mounting the apparatus as an attachment on a standard printer, including those which are now commercially available. The apparatus may also include a viewing station which allows the operator to view the film before it is printed, and automatic means may also be provided to inactivate the printer when an unexposed or underexposed print is reached. In addition, automatic means are provided to sense a splice and make an appropriate indication of the photographic paper.

BRIEF DESCRIPTION OF THE DRAWINGS

FIG. 3 is a plan view of the negative feeder in accordance with the invention;

FIG. 4 is a sectional view taken along the line 4—4 of FIG. 3;

FIG. 5 is another sectional view taken along the line 5—5 of FIG. 3;

FIG. 6 is another sectional view taken along the line of 6—6 of FIG. 3;

FIG. 7 is a sectional view taken along the line 7—7 of FIG. 6;

FIG. 8 is another sectional view taken along the line 8—8 of FIG. 3;

FIG. 9 is a schematic illustration of the electric circuitry and control system of the invention;

FIG. 10 is a schematic illustration of a modified frame sensing device;

DESCRIPTION OF THE PREFERRED EMBODIMENT

Figure 1:
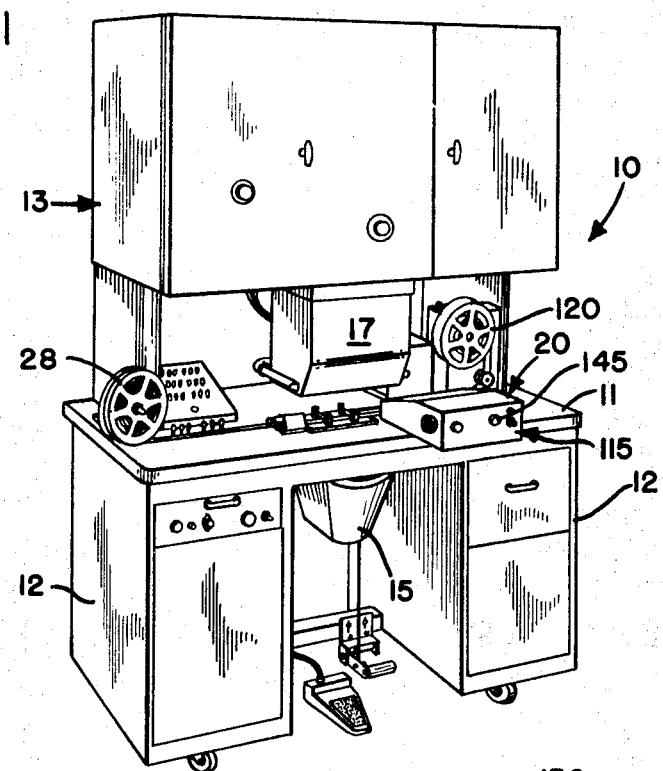
FIG. 1 is a perspective view showing the negative feeder mounted on a photographic printer.

FIG. 1 illustrates the negative feeder mounted on a conventional negative printer 10, for example, of the type shown in U.S. Pat. No. 3,025,758, wherein a flat table top 11 is supported on the side legs 12 of the printer. A printer housing 13 is provided above the table top 11 and includes suitable conventional means for moving photographic print paper from a supply reel to a take-up reel and for exposing the print paper therebetween. A lamp housing 15 is provided below the central portion of the table top 11 to project light upwardly to a small opening 16 (FIG. 3) in the table top 11 and into the lens housing 17 which focuses the image from a photographic negative disposed above the opening 16 onto the print paper material.

This invention is directed to the negative feeder attachment 20 for moving a continuous strip of negatives 21 past the opening 16 for automatic printing thereof. This strip preferably includes a large number of rolls of negatives which have been spliced together to create the very long strip. The negatives have individual frames 23 (FIG. 3) between the parallel side edges 24 and 25, and each frame has a rectangular aperture 27 near one edge 24 thereof.

The negative feeder 20 includes a supply reel 28 which unreels the film strip 21 passage through a viewing station 30, a print station 31 above the opening 16, a drive station 32 which controls the movement of the strip, and a take-up station 33 which rewinds the strip. The supply reel 28 is mounted for rotation on an upstanding bracket 35 secured to the table top 11 adjacent the left-hand edge 36 thereof. The reel 28 is secured on this bracket by the horizontal pin 37 of conventional design having the pivotal lock finger 38 for securing the reel for free rotation thereon in the usual manner.

All other components of the negative feeder 20 are mounted on a flat base 40 which is adjustably secured to the flat surface of the table top 11 by the fastening members 41. The base has parallel guides 43 for moving the film strip 21 across the base through the viewing, printing, and drive stations 30–32. These guides are seen in FIG. 4 and include upper and lower guide plates 44 and 45 with a spacer 46 therebetween all of which are secured to the base 40 by the spaced screws 47. The innermost edges 48 of the upper and lower guides 44 and 45 thus provide a guide slot 50 which receive the side edges 24 and 25 of the film strip 21 to guide its movement.

At the viewing station 30, an opening 52 is provided in the table top 11 so that a portion of the light from the housing 15 shines through. A similar opening 53 is provided in the base 40 with a glass window 54 therein so that the light shines through the window and the strip 21 to enable the operator to view the one of two frames 23 prior to their reaching the printing station 31. A small hood 55 having the side walls 56 and top wall 57 is secured over the viewing window 54 so that the light shining therethrough is blocked from entering the lens housing 17 during the printing of another frame located at the printing station. The front of this hood 55 is open so that the frames above the window 54 can be readily viewed by the operator.

At the printing station 31, another opening 57 is provided in the base 40 aligned with the similar opening 16 (FIG. 6) in the table top 11 through which the light is projected to project the image into the lens housing 17. Another window 58 covers the opening 57 and the guide 44a are provided on both sides of the film strip except in the area of the sensing switch 60, as will be described. To hold the film strip flat on the window 58 and free from buckling, a guide roller 62 is provided on either side of the window 58. Each of these rollers 62 includes a cross shaft 63 mounted in the roller bearings 64 supported in the bracket 65 on either side of the film strip 21, and the outer surface of the rollers is a soft rubber material or its equivalent so that no damage is done to the negative strip 21. The bearings 64 are mounted for vertical movement and are urged downwardly by the coil springs 67 interposed between the bearings 64 and the top surface 68 of the bore 69 formed in the brackets 65. Thus, the bearings 64, which support the cross shaft 63, can move vertically to allow the strip to be initially fed and therebelow while holding the frame firmly on the window 58.

A sensing switch 70 is provided between the rollers 62 and mounted on the upstanding bracket 72 which is secured to the base 40 by the screws 73. This switch includes an arm 74 pivotally mounted by a pin 75 on the upper portion of the bracket 72 and extends downwardly and has a horizontal finger 76 thereon. A tapered projection 77 extends downwardly from the lower surface of this finger and is adapted to be received in the small apertures 27 provided in the edge of the film strip 21. The arm 73 is urged downwardly by the switch actuator 78 so that it is held against the film strip. When the projection 77 is not in one of the apertures 27, the switch 79 is closed and when the projection 77 is received within one of the apertures, the switch is open. This vertical movement of the actuator 78 operates the small switch 79 to actuate the advancing of the film strip 21, as will be further described From the printing station 31 the negative strip 21 proceeds through the parallel guide channels 44b to the drive station 32 wherein the movement of the film strip 21 is precisely controlled. The drive apparatus includes a spindle shaped drive wheel 80 (FIG. 8) mounted on the drive shaft 81 which is supported at one end by the ball bearing 82 pressed into the opening 83 in the upstanding bracket 84 secured to the base 40 by the screws 85. The other end of the shaft 81 is supoprted by the brake device 86 mounted on the bracket 87 adjacent the drive wheel 80.

The wheel 80 itself is secured to the shaft 81 by the lock screw 89, and engages the longitudinal edges 26 and 27 of the film strip through the annular flanges 90 having the resilient O-rings or tires 92 positioned in the circumferential grooves 93 thereon. The spacing between these tires 92 is slightly less than the width of the film strip 21 so that they have firm contact with the edges 24 and 25 thereof. The guide channels 44b are cut away in the area 95 so that the tires 92 engage the film strip with substantial point contact although the deformation of the tires allows slightly more contact.

The support rolls 96 provide a support to the strip 21 immediately below the contact by the tires 92 so that the strip is gripped firmly for positive driving. These backing rollers 92 are mounted in the slots 97 formed in the base 40 by an enlongated shaft 98 which extends through the base 40. The shaft 98 need not be mounted for rotation since the rollers 96 can move relatively thereto, and a retainer 99 is provided to permit removal of the shaft.

The drive roll 80 is driven by the electric motor 100 having the gear reduction unit 101 mounted thereon with its drive shaft 103 being disposed at right angles to the drive shaft of the motor 100 in conventional manner. This drive shaft 103 is connected to an electric clutch 105 mounted on the bracket 106 which is secured to the base 40. The shaft 108 of the clutch is mounted to the coupling 109 to the automatic brake 86 mounted on the bracket 87. The intermediate shaft 111 is supported by the bracket 113 between the clutch 105 and brake 86. The operation of the clutch and brake is such that one of them is always engaged while the other is disengaged, as will become apparent in the description of the operation. A cover 115 is provided over this portion of the negative feeder 20 and is secured in place by the brackets 116 mounted on the base. A front panel 117 provides support for the on-off switch 118 as well as the indicator light 119 which lights when the device is energized.

Figure 2:
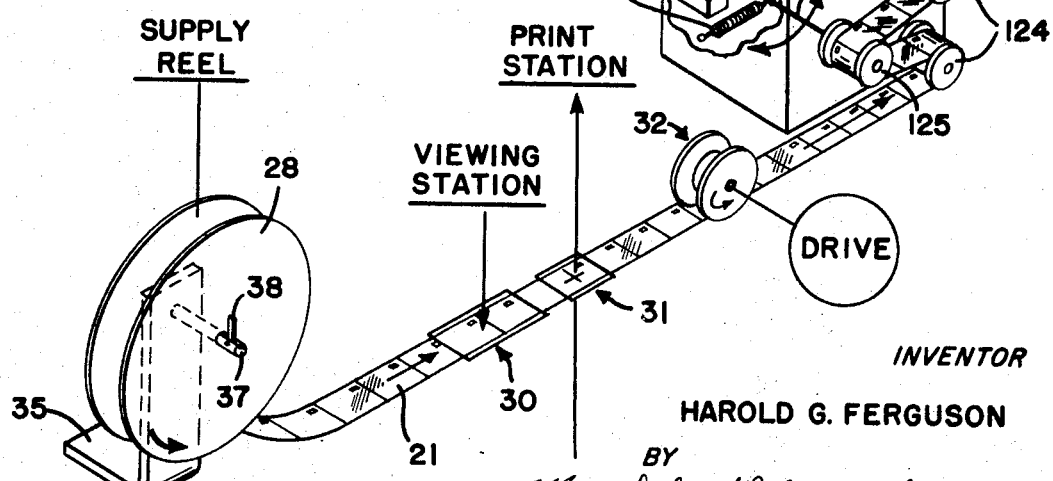
FIG. 2 is a perspective view showing the supply and take-up apparatus for the continuous strip of negatives.

The take-up apparatus (FIG. 2) is adapted to sense automatically the movement of the film strip 21 and to wind the strip on the reel 120 only when it is being advanced by the drive wheel 80. Thus this apparatus includes a pair of stationary guide rollers 124 and a movable guide roller 125 therebetween which is drawn toward the two stationary rollers 124 when tension is present in the film strip 21. This movable roller is mounted on a shaft 127 which permits its movement against the bias of the spring 128, and take-up reel 120 is driven by the motor 130 which supports the reel on its shaft 131 having the conventional lock 132 thereon. Operation of the motor 130 is terminated when the movable guide roll 125 is moved to the right to operate the switch 133 when tension is applied to the film strip 21 indicating that the drive roll 80 has stopped.

The operation of the negative feed 20 is best described in connection with the electrical circuitry shown schemically in FIG. 9. Thus, when the negative feeder 20 has been properly mounted on the table 11 and the various electrical connections at the printer 10 are made, the reel 28 containing an elongated strip 21 of negatives is placed on the bracket 35. The initial portion of the strip 21 contains blank frames or is a feeder section with no frames to be printed. The end of the strip is unreeled and inserted into the guides 43, beneath the rollers 62, through the guides 44a, and beneath the drive wheel 80. The end is then wound around the stationary rollers 124 and the movable roller 125 and secured in the conventional manner to the take-up reel 120. The strip 21 is wound onto the take-up reel 120 until the first frame to be printed reaches the viewing station 30 at which time the manual switch 118 in line 140 (FIG. 9) is closed to connect the power source 141 to the lines 142 and 143. This energizes the light 119 indicating that the system is ready for operation.

The button 145 on the panel 117 is then depressed closing the switch 146 in line 147 to connect the source 141 of power to the relay 148 in line 150. This action immediately moves the switch 152 from its normally closed position wherein it opens the circuit to the electrically operated brake 86 in line 153 and shifts the switch 152 to an operative position where electrical power is connected to the clutch 105 in line 155. The brake 86 is thus released and the clutch 105 engaged so that the motor 100 drives the wheel 80 having the tires 92 thereon which engage the marginal edges 24 and 25 of the strip 21.

Rotation of the drive wheel 80 advances the film strip 21 through the guide channels 43, 44a and 44b past the viewing and print stations 30 and 31. The take-up reel 120 begins to rewind the strip 21 once the tension on the strip is reduced so that the spring 128 moves the movable roller 125 to the left, as viewed in FIG. 2, so that the switch 133 is closed to complete a circuit to the motor 130 which drives the reel 120. Thus, the take-up mechanism operates automatically to rewind the strip 21 any time tension is removed from the strip by advancing movement thereof.

As the film advances, the projection 77 is cammed outwardly of the elongated apertures 27 in the strip which causes the finger 76 to move upwardly and close the switch 70 maintaining a circuit to the relay 148 in the line 150. The switch 152 thus remains in its operative position so that the clutch 105 remains engaged. When the film advaces the length of one frame 23, the projection 77 drops into the next operation 27 which opens the switch 79 and the circuit to the relay 150 causing the switch 152 to move to its normally closed position wherein the clutch 105 is disengaged and the brake is engaged. This terminates rotation of and immediately locks the drive wheel 80 so that there is no further advance of the strip 21.

At the same time the brake 86 is engeged, the deenergization of the relay 148 closes the normally closed switch 157 in line 158 to energize the relay 159 which commences operation of the printer 10. The light in the housing 15 is then energized to transfer the image to the lens system 17 and into the printer. Once this printing operation is completed, the printer 10 momentarily closes the switch 163 in line 164 to energize the relay coil 165 which closes the switch 166 in line 167 to again complete the circuit to the relay coil 148 which moves the switch 152 to its operative position once again to advance the strip. As a result, the entire system works automatically with the strip 21 being advanced one frame at a time, and a print is made automatically from each frame. It is merely necessary for the operator to remove and replace the supply and take-up reels 28 and 120 after each reel of negatives has been printed.

A modified form of the invention is shown in FIG. 10 wherein electronic means are provided for sensing the advance of the strip and for actuating the printer relay 159a. Accordingly, the circuitry includes a rectifier 170 for converting the alternating current in the lines 171 to direct current which is supplied to the lines 172 and 173. The relay coil 174 is disposed in the line 172, and current is controlled by a suitable electronic switch 175 in the line 176. The control signal for the switch 175 is provided by the photocell 177 in the line 178 which is connected between the lines 172 and 173 having the adjustable resistor 179 in line 180 therein.

The photocell 177 is physically disposed below the strip 21 so that no light is received by the photocell except when an aperture 27 or a clear transparent opening is positioned above the photocell. When this occurs, indicating that a frame is properly positioned above the opening 16, the light passing through the aperture 27 energizes the photocell 177 which in turn causes the electronic switch 175 to conduct current through the line 176 causing the relay coil 174 to be energized which terminates operation of the drive wheel 80 by shifting to switch 152 to engage the brake 86 and disengage the clutch 105, and at the same time engaging the printer 10 to make the necessary print.

While this embodiment is intended to sense the advance of the strip 21, it could also be utilized to inactivate the printer 10 when an unexposed or underexposed frame 23 is reached. Such a frame is transparent so that more light shines therethrough. By sensing the passage of light through the nearly clear frame, the photocell could inactive the printer 10 and activate means to close the switch 163 to continue the advance of the strip to the next frame.

Figure 11:
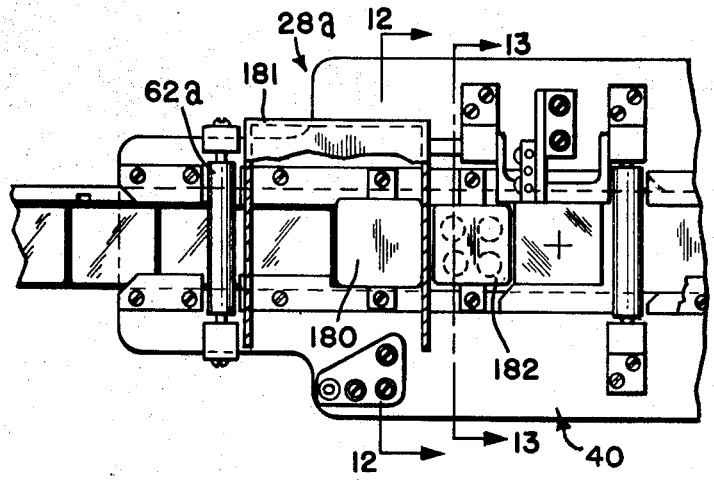
FIG. 11 is a plan view of another embodiment of the invention.

Another embodiment of the invention as shown in FIGS. 11–14 wherein automatic means are provided for sensing the splice between adjacent strips of the film strip 21 to place a marking on the photographic paper in the printer 10 so that the end-of-order can be sensed by automatic equipment used to sever the pictures of each order. In addition, the automatic means insures that no print will be made of an opague or under-exposed, as well a blank or overexposed frame. Accordingly, FIG. 11 illustrates the negative feeder 28a having a base 40 and various other components similar to the base shown in FIGS. 1–9 so that similar components are given identical reference characters. In addition, a solar cell device 180 is mounted within the viewing hood 181, and a photocell device 182 is mounted above the negative frame immediately adjacent the window 58 through which the exposure is made. In order to position this photocell device 180, the guide roller 62a immediately adjacent the window in FIG. 3 has been moved to a position immediately ahead of the viewing hood 181, as shown in FIG. 11, and this guide roller 62a is otherwise identical to the roller 62.

The solar cell device 180 (FIG. 2) is mounted in a housing 185 which has the horizontally extending tabs 186 extending laterally therefrom to receive the screws 187 which extend through the guides 43 into the base 40 to hold the solar cell device 180 in position immediately above the negative and the transparent window 188. The solar cell device 180 has a size which is substantially identical to the size of a single frame so that the light shining through the opening 189 from lamp housing 15 passes through the negative and is sensed by the solar cell device.

The photocell device 182 (FIG. 13) incldes a mounting plate 190 which is also mounted on the base 40 and is substantially opaque except that the four photocells 192 having their top surfaces extending therethrough to receive light from the bulb 194 disposed in the housing 195 above the negative strip. This housing 195 is secured in place by the screws 196 which extend through the transverse tabs 197 on the housing so that substantially the only light which is received by the four photocells 192 is that which passes from the bulb 194 through the strip.

Figure 15:
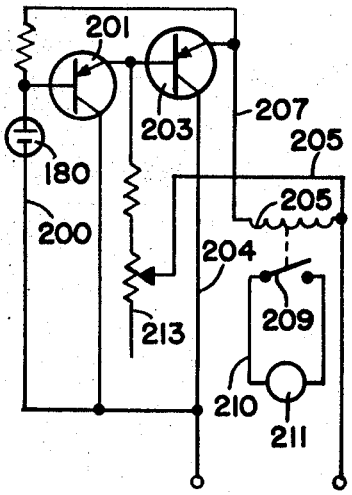
FIG. 15 is a schematic illustration of the electrical circuitry for the solar cell end-of-order system.
Figure 12:
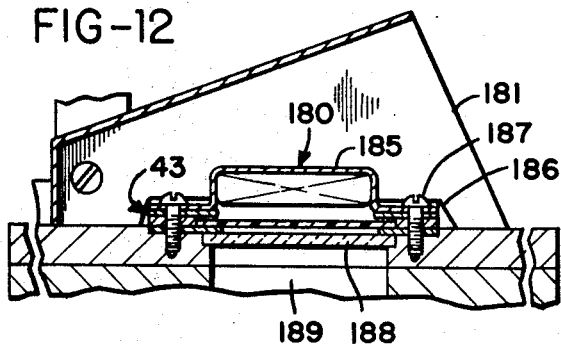
FIG. 12 is a sectional view taken along the line 12—12 of FIG. 11.
Figure 13:
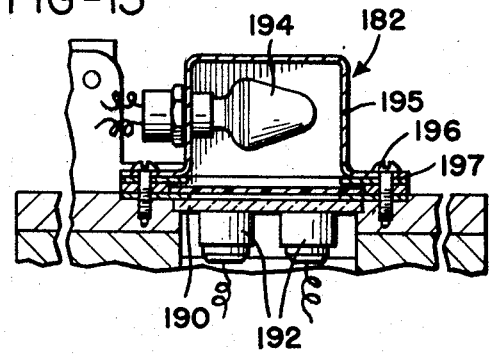
FIG. 13 is another sectional view taken along the line 13—13 of FIG. 11.

The operation of the solar cell and photocells is best explained in connection with FIGS. 10, 14, and 15 which show the electrical schematics. Thus, the operation of the solar cell device 180 is shown in FIG. 15 wherein the solar cell 180 itself is mounted in line 200 so that when it receives a certian amount of light it causes current to conduct therethrough so that the transistor 201 has its bias raised to a level which causes it to conduct thereby biasing the transistor 203 causing the current to flow from the line 204 through the relay 205 and through the line 207. This actuates the relay 205 causing the switch 209 in line 210 to be opened to deactivate the marking device 211. When the light picked up by the solar cell 180 is reduced to nearly zero the transistors 201 and 203 no longer conduct thus shifting the relay 205 and closing the circuit through line 210 to actuate the device 211 which places a mark of some type, for example, magnetic ink, on the photographic paper in the printer indcating that the splice has been sensed and that this is the end of an order.

Because the solar cell 180 is mounted two frames away from the actual printing station, the marking device 211 is placed in the printer 15 so that the mark is placed on the photographic paper at the proper place to indicate the end of the order. The sensitivity of the solar cell 15 can be varied by varying the resistor 213 which changes the current flowing in the line 214 and thus the point at which the transistor 203 will commence conducting. In this manner, the system can be properly calibrated to be actuated only when the light shining from beneath the viewing hood 181 is blocked from passing through the negative strip to the solder cell 180.

Figure 14:
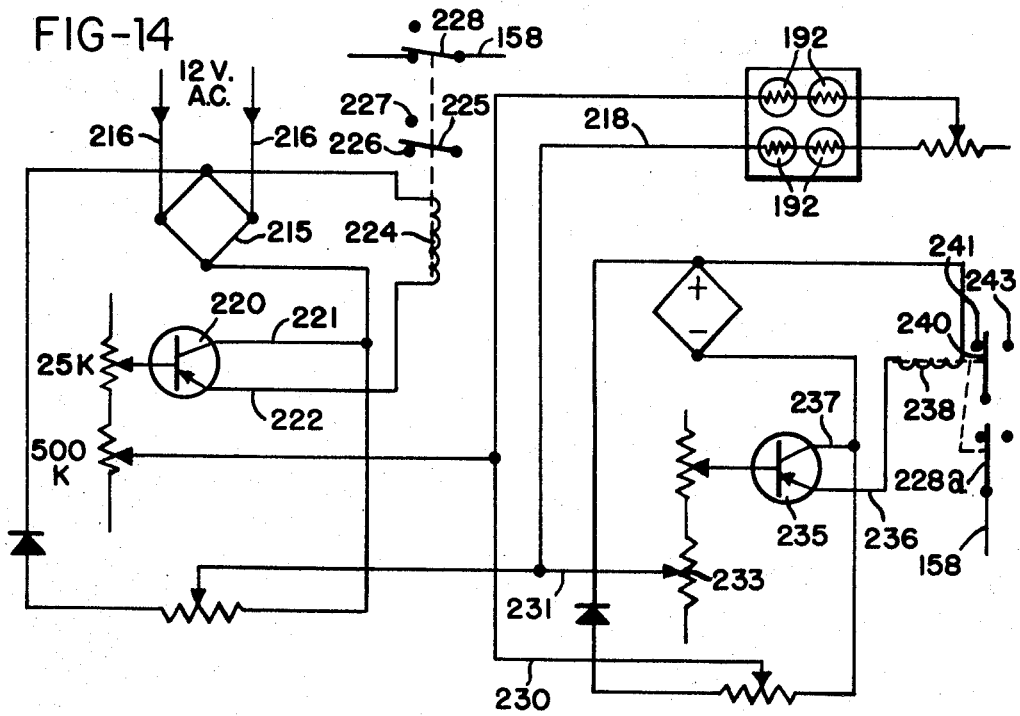
FIG. 14 is a schematic drawing of the electrical circuitry for the embodiment shown in FIGS. 11–13.

Referring now to the photocell embodiment utilized to sense underexposed or overexposed frames so that unnecessary prints are not made, FIG. 14 shows the source of current being supplied through the rectifier 215 through the lines 126. The four photocells 192 are mounted in a line 218 in series and to conduct a maximum or minimum amount of current depending upon the amount of light they receive. Because they are mounted in series, the effect of each photocell 192 is added to the effects of the others so that the frame must be completely dark or completely light in each of the four quadrants of the negative frame in order to affect operation of this system.

When an overexposed frame allows maximum light to pass through a negative frame, the photocells 192 conduct a maximum current through the lines 218 causing the bias of the transistor 220 to be altered to permit current flow through the lines 221 and 222 causing the relay 224 to be energized to move the switch 225 from the contact 226 to the alternate contact 227. This causes a circuit to be completed between and around the switches 79, 145, and 166 (FIG. 10) to energize the clutch 105 and to deenergize the brake 86 to advance the negative strip to the next frame. At the same time, the relay 225 opens a normally closed switch 228 in line 158 so that the printing operation in the printer does not occur. On the other hand, if a normal partially exposed frame passes the photocells 192, sufficient light will not pass from the bulb 194 to the photocells 192 and thus the switches 225 and 228 remain in their normally opened and closed positions, respectively.

The other portion of the circuitry of FIG. 14 is utilized for sensing very dark frames, such as those which are underexposed, to pass them through the printer 15 without actually making the print. Thus, when a dark frame passes through the housing 182, the photocells 192 generate a certain level of current which is supplied through the lines 218, 230, and 231 and the adjustable resistor 233 to bias the transistor 235. This causes the transistor to conduct through the lines 236 and 137 to energize the relay 238 and move the switch 240 against the normally closed contact 241 which does not in any way affect the normal operation of the negative feeder. However, when the amount of light is passing through the frame is below a preset level, the amount of current generated by the photocells 192 is not sufficient to cause the transistor 235 to conduct so that the relay 238 is moved to its normaly closed position which moves the switch 240 to contact 243 causing energization of the relay 148 which immediately energizes the clutch 105 and deenergizes the brake 86 and causes the switch 228a to be opened thereby inactivating the printer. This action causes the film to be advanced to the next succeeding frame thus skipping the underexposed frame.

Accordingly, the invention has provided a negative feeder attachment adapted to be mounted on a photographic printer for the purpose of automatically and continuously feeding one frame at a time over the exposure opening of the printer. The operator need only replace the reels after one reel has been printed, and thus one person can operate many machines having this adapter thereon. While the invention has been disclosed as mounted for attachment on a standard photographic printer, it is within the scope of the invention to build the automatic feeder into the printer. Moreover, the means for sensing the advance of one frame can be either mechanical or electronic as seen in the two embodiments disclosed herein, and it is possible that other mechanism could be utilized without departing from the scope of the invention. Means are also provided to automatically sense the end of an order, as well as overexposed and underexposed negatives to block printing thereof.

While the forms of apparatus herein described constitute preferred embodiments of the invention, it is to be understood that this invention is not limited to these precise forms of apparatus and that changes may be made therein without departing from the scope of the invention which is defined in the appended claims.

What is claimed is:

1. An automatic feeder for advancing a continuous strip of negatives past an opening within the table of a photographic printer having means for directing light through said opening and means for advancing a continuous strip of photographic print paper through the light path defined by said opening, and wherein said strip of negatives has an aperture for each frame thereon, said feeder comprising a drive wheel for engaging the strip of negatives, means for driving said wheel and including a clutch, means for sensing the location of each aperture on said strip, and automatic control means for actuating said clutch and said printer in response to actuation of said sensing means.

2. An automatic feeder as defined in claim 1 wherein said drive wheel has annular flanges spaced a distance slightly less than the width of the strip of negative and resilient tire means on said flanges for engaging the opposite marginal edges of said strip.

3. An automatic negative feeder as defined in claim 1 including an aperture in said base, a source of light below said base adapted to shine through said aperture, and viewing hood means partially covering said aperture to shield the photographic printer from the light passing through said aperture.

4. An automatic negative feeder as defined in claim 1 wherein a transparent cover is provided over said opening, and guide rollers are resiliently mounted above the path of the strip of negative for holding the strip against said transparent cover.

5. An automatic negative feeder as defined in claim 2 including backing rolls positioned below the point at which said tire means engages the strip to provide backing support for the strip and permit firm engagement of the strip by said drive wheel.

6. An automatic negative feeder for advancing a continuous strip of negatives past an opening in the table of a photographic printer, comprising a base adapted to be mounted on the table of the printer, guide means on said base for guiding the strip of negatives over said opening, automatic means for advancing and stopping the strip of the negatives sequentially to stop each frame over said opening, said automatic means including a motor connected to said drive wheel through a clutch and a brake, and means for alternately engaging and disengaging said clutch and said brake for precisely aligning each frame over said opening.

7. An automatic negative feeder as defined in claim 6 wherein said automatic means operate said clutch and brake in response to movement of said strip and the photographic printer so that said film strip is advanced one frame at a time through said guide means.

8. An automatic negative feeder for advancing a continuous strip of negatives past an opening in the table of a photographic printer and wherein said strip has an aperture for each frame, comprising a base adapted to be mounted on the table of the printer, guide means on said base for guiding the strip of negatives over said opening, automatic means for advancing and stopping the strip of negatives sequentially to stop each frame over said opening, and said automatic means including a projection for engaging each aperture to terminate advancement of the strip for precisely aligning each frame over said opening until a print is made.

9. An automatic negative feeder for advancing a continuous strip of negatives past an opening in the table of a photographic printer, comprising a base adapted to be mounted on the table of the printer, guide means on said base for guiding the strip of negatives over said opening, automatic means for advancing and stopping the strip of the negatives sequentially to stop each negative frame over said opening, and said automatic means include photocell means for sensing whether each frame is underdeveloped or overdeveloped and for passing each underdeveloped or overdeveloped frame so that no print is made.

10. An automatic feeder as defined in claim 9 wherein said photocell means includes a plurality of photocells mounted on said base adjacent said opening, and electronic means for automatically advancing a strip of negatives a distance of one frame when an underdeveloped or overdeveloped frame is sensed by said photocell means.

References Cited

UNITED STATES PATENTS

| | | | |
|---|---|---|---|
| 2,594,358 | 4/1952 | Shaw | 355—41 |
| 2,621,560 | 12/1952 | Steinhardt | 355—41 |
| 2,746,549 | 5/1956 | Roth | 355—41 |
| 2,754,721 | 7/1956 | Grass | 352—169 |
| 3,025,758 | 3/1962 | McAdam et al. | 355—70 |

FOREIGN PATENTS 835,431  5/1960  Great Britain.

NORTON ANSHER, Primary Examiner

M. HARRIS, Assistant Examiner

U.S. Cl. X.R.

352—169, 184; 355—68